June 15, 1926.
I. FOX
1,588,401
DEVICE FOR LOCATING THE OPTICAL CENTERS OF EYES
Filed May 21, 1925
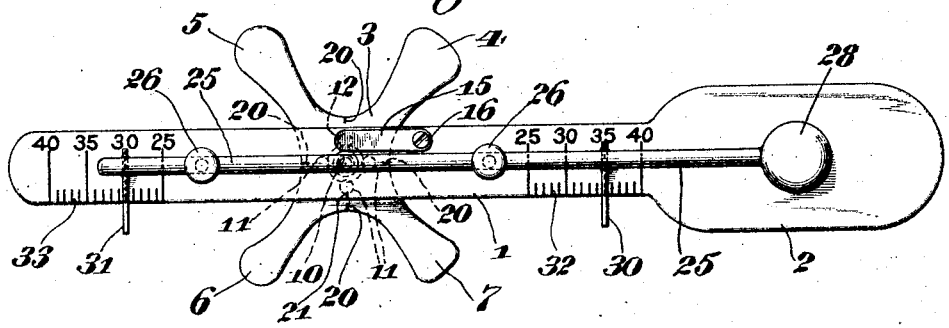
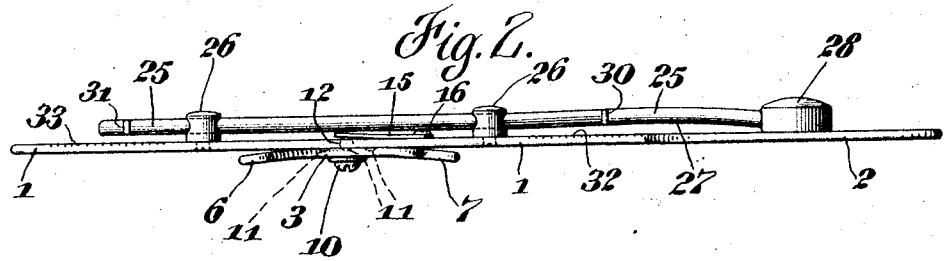
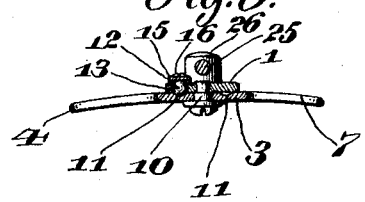
INVENTOR
Ivan Fox
BY Cyrus N. Anderson
ATTORNEY Patented June 15, 1926.

1,588,401

UNITED STATES PATENT OFFICE.

IVAN FOX, OF MEDIA, PENNSYLVANIA.

DEVICE FOR LOCATING THE OPTICAL CENTERS OF EYES.

Application filed May 21, 1925. Serial No. 31,777.

My invention relates to a device for use in ascertaining or measuring the distances of the optical centers of the eyes of a person from a plane medial to the nose of such person.

As far as I am aware, no mechanical device has been constructed heretofore by the employment of which the positions of the optical centers of the eyes with respect to a plane medial to the nose may be ascertained and measured with accuracy.

It is a fact quite well known, particularly to opticians, that the optical centers of eyes are different distances from a plane medial to the nose of a person. Usually, the distance between such medial plane and the optical center of the left eye is less than the distance between such medial plane and the optical center of the right eye. In the fitting of glasses, it is necessary that the difference between these distances be ascertained and that the glasses for the correction of defects of vision be fitted accordingly.

The general object of the present invention is to provide a device by the employment of which the distances of the optical centers of eyes from a medial plane through the nose of a person may be ascertained with accuracy and exactness.

It is also an object of the invention to provide a device of the character indicated having means whereby it is adapted for use in connection with persons having noses of different conformations or shapes.

A further object of the invention is to provide a device comprising means which is adapted to be fitted upon the nose of a person whose eyes are being examined and with pointers which are adapted to cooperate with each of the eyes for the purpose of enabling the location of the optical centers and measuring the distances of the same from a plane medial to the nose of such person.

Other objects and advantages of the invention will be pointed out in the detailed description thereof which follows or will be apparent from such description.

In order that the invention may be readily understood and its practical advantages fully appreciated, reference may be had to the accompanying drawing in which I have illustrated one convenient form of mechanical embodiment thereof. However, it will be understood that the invention is susceptible of embodiment in other forms of construction than that shown and that changes in the details of construction may be made within the scope of the claims without departing from the principle of the invention.

In the drawing:

Figure 1 is a view in front elevation of a device embodying the invention;

Figure 2 is a top plan view thereof; and

Figure 3 is a transverse sectional view showing more clearly certain details of construction.

Referring to the drawing: It will be noted that the device comprises a plate member having a relatively narrow portion 1 and a wider handle portion 2. The relatively narrow portion 1 is provided with a rotatable member or element 3 having radially extending arms 4, 5, 6 and 7. The spaces between these arms are curved as indicated so as to provide saddle-like portions for fitting over the bridge portions of the noses of persons who are to be fitted with eye glasses or spectacles. It will be noted that the portion between the arms 5 and 6 has a greater radius of curvature than does the portion between the arms 4 and 7, and that the radius of curvature between the arms 6 and 7 is less than the radii of the curvatures between the arms 5 and 6 and 4 and 7, but greater than the radius of curvature of the portion between the arms 4 and 5. In other words, saddle seats for fitting upon the noses of various dimensions are provided to accommodate persons with noses of different shapes and conformations.

The rotatable member 3 is mounted upon a pivot bolt 10, the small end of which is secured at about the middle of the portion 1 previously referred to. The rotatable member 3 is provided with depressions 11 upon its inner side with which a ball 12 is adapted to cooperate, which ball is mounted in an opening 13 in the portion 1 previously referred to.

A spring plate 15 is secured by means of a screw 16 to the relatively narrow portion 1. The outer free end of said spring plate bears against the ball 12 upon the opposite side of the member 1 from that on which the member 3 is located. The depressions or seats 11 in the member 3 for the balls are located in position to hold the member 3 in correct position for fitting any one of the seats formed between adjacent arms 4, 5, etc., upon the nose of a person whose eyes are being examined for glasses or spectacles.

For the purpose of assuring that the rotatable member 3 is in proper position with respect to the portion 1, I have provided marks 20 at the center of the seats formed between the arms 4, 5, 6 and 7, and also a mark upon one edge of the member 1 as indicated at 21. The marks 20 and 21 should be brought into exact alinement at which time the ball 12 should fit in some one of the depressions 11.

The member 3 having been adjusted so as to bring into position the proper seat to be fitted upon the nose, the said member is then placed upon the nose after which the rod 25 is adjusted back and forth through its bearings upon the studs 26 which are secured to the narrow portion 1 of the plate previously referred to. In order to create slight pressure between the rod 25 and the surfaces of the said bearings, the said rod is slightly bent as indicated at 27 so that the head 28 fastened upon the right hand end thereof presses yieldingly against the relatively wide portion 2 of the said plate. The studs 26 are located at substantially equal distances upon opposite sides of the point of connection of the member 3 to the relatively narrow portion 1 of the plate.

The rod 25 is provided with projections or pointers 30 and 31 which are adapted to cooperate with scales 32 and 33, the inner ends of which are located equal distances from the axis of the rotatable member 3, being twenty-five millimeters in the construction shown.

In the use of the device, the operator holds the plate by the relatively wide handle portion 2 and places the same in cooperative relation with respect to the eyes of a person, the member 3 having been rotated to bring the saddle seat of the shape and size to best fit the nose of the person being treated into position to be placed on the bridge of the nose. The member 3 should be placed with the mark 20 thereof as nearly within the medial plane of the nose as is practically possible. This having been done, the rod 25 is adjusted so as to first place one of the pointers 30 or 31 in alinement with the optical center of an eye and thereafter readjusted to place the other of said pointers in line with the optical center of the other eye. After each measurement or determination, the distance of said pointer from the medial line of the nose is ascertained by comparing the pointer with the adjacent scale.

The pointer 31 and scale 33 are employed in connection with the right eye of the person whose eyes are being examined while, of course, the pointer 30 and scale 32 are employed in connection with the left eye of such person.

The distance of the optical centers of the eyes from the medial plane of the nose having been ascertained, a proper record thereof is made and employed in the construction of the lenses and the mounts therefor so that in the completed glasses or spectacles it will be found that the optical centers of the lenses occupy positions in proper relation to the optical centers of the eyes. This is important, because, if the optical centers of the lenses are not in proper positions with respect to the eyes, the glasses will not be satisfactory no matter with what care the mountings may have been constructed nor with what care the lenses may have been ground and polished.

Having thus described my invention, what I desire to secure by Letters Patent is:

1. A device for ascertaining and measuring the distances of the optical centers of eyes from a medial plane through the nose, comprising, in combination, a relatively narrow plate having scales formed thereon, a rotatable member mounted on said plate intermediate said scales, said member having a plurality of saddle seats formed thereon, pointers adapted to cooperate with said scales, and means movably supporting said pointers upon said plate.

2. A device for ascertaining and measuring the distances of the optical centers of eyes from a medial plane through the nose, comprising, in combination, a plate having scales thereon in spaced relation to each other, a member rotatably mounted upon said plate midway between said scales, said member having a plurality of radially extending arms between which curved seats are formed, studs provided with openings and projecting from the said plate, and a rod slidably mounted in openings which extend through said studs, said rod being held in substantially parallel relation to the said plate and being provided with pointers which are adapted to cooperate with the said scales.

3. A device for ascertaining and measuring the distances of the optical centers of eyes from a medial plane through the nose, comprising, in combination, a plate member having scales formed thereon in spaced relation to each other, a rotatable member mounted on said plate midway between said scales and upon the opposite side thereof from that on which said scales are located, said rotatable member having a plurality of radial arms between which seats are formed and said member being also provided with depressions located at intervals upon the inner sides thereof, spring-pressed means mounted within an opening of said plate for engaging the said depressions for yieldingly holding the said rotatable member in any one of a plurality of positions to which it may be adjusted, and the said plate being provided with studs having openings extending transversely therethrough, and a pointer carrying rod mounted within said openings, substantially as described.

4. A device for ascertaining and measuring the distances of the optical centers of eyes from a medial plane through the nose, comprising, in combination, a relatively narrow plate having scales formed upon one side thereof in spaced relation to each other, means for positioning said plate upon the nose of a person with the said scales located symmetrical with respect to a medial plane through the nose, studs projecting from the front face of the said plate which studs are provided with transversely extending openings therethrough, a rod mounted in said openings, said rod having a head portion and being provided with a bend whereby said head portion is held yieldingly against a portion of the said plate, and the said rod being provided with pointers which are adapted to cooperate with the said scales, substantially as described.

5. A device for ascertaining and measuring the distances of the optical centers of eyes from a medial plane through the nose, comprising, in combination a plate having a member rotatably mounted thereon, said member having a plurality of saddles which are adapted to rest upon the nose of a person and to position said plate relatively thereto, and means carried by said plate for ascertaining the distance of the optical centers of the eyes from the said medial plane.

6. A device for ascertaining and measuring the distances of the optical centers of eyes from a medial plane of the nose of a person, comprising, in combination, a plate having scales upon one side thereof in spaced relation to each other, a member rotatably mounted on said plate the axis of rotation being midway between the said scales, yielding means for holding said rotatable member in adjusted positions and the said rotatable member being provided with means whereby it is adapted to fit upon the nose of a person, pointers adapted to cooperate with said scales, and a support for said pointers adjustably mounted upon said plate.

In testimony that I claim the foregoing as my invention I have hereunto signed my name this 11th day of May, A. D., 1925.

IVAN FOX.